United States Patent
Mizutani (10) Patent No.: US 7,547,342 B2
(45) Date of Patent: Jun. 16, 2009

(54) CERAMIC FILTER

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 295 days.

(21) Appl. No.: 10/592,804

(22) PCT Filed: Mar. 23, 2005

(86) PCT No.: PCT/JP2005/005228

§ 371 (c)(1),
(2), (4) Date: Sep. 14, 2006

(87) PCT Pub. No.: WO2005/089902

PCT Pub. Date: Sep. 29, 2005

(65) Prior Publication Data

US 2007/0240396 A1    Oct. 18, 2007

(30) Foreign Application Priority Data

Mar. 23, 2004  (JP) ............................ 2004-085374

(51) Int. Cl.
*B01D 39/20* (2006.01)

(52) U.S. Cl. ........................ 55/523; 55/DIG. 30; 60/311

(58) Field of Classification Search ................... 55/523, 55/282.3, DIG. 30; 60/311; 422/177, 180
See application file for complete search history.

(56) References Cited

U.S. PATENT DOCUMENTS

| | | | |
|---|---|---|---|
| 4,519,820 A * | 5/1985 | Oyobe et al. .................. 55/284 |
| 4,667,469 A * | 5/1987 | Abthoff et al. ................. 60/311 |
| 5,720,787 A * | 2/1998 | Kasai et al. .................... 55/282 |
| 6,508,852 B1 * | 1/2003 | Thompson et al. ............. 55/523 |
| 6,800,108 B2 * | 10/2004 | Noda .......................... 55/523 |
| 6,840,976 B2 | 1/2005 | Vance et al. |
| 7,090,714 B2 * | 8/2006 | Otsubo et al. ................. 55/523 |
| 7,107,763 B2 * | 9/2006 | Suwabe et al. ................ 60/295 |
| 7,204,965 B2 * | 4/2007 | Okawara et al. ............ 422/177 |
| 7,244,284 B2 | 7/2007 | Miwa et al. |
| 7,297,175 B2 * | 11/2007 | Miwa .......................... 55/523 |
| 2004/0053781 A1 | 3/2004 | Okawara |
| 2005/0120691 A1 | 6/2005 | Miwa |

FOREIGN PATENT DOCUMENTS

| JP | 02 063020 U | * | 5/1990 |
| JP | A 5-261300 | | 10/1993 |
| JP | A 2003-254034 | | 9/2003 |
| JP | A 2003-269132 | | 9/2003 |
| JP | A 2004-113930 | | 4/2004 |
| KR | 10-2004-0023794 | | 3/2004 |
| KR | 10-2004-0024483 | | 3/2004 |

* cited by examiner

*Primary Examiner*—Duane Smith
*Assistant Examiner*—Robert A Clemente
(74) *Attorney, Agent, or Firm*—Oliff & Berridge, PLC (57) ABSTRACT

A ceramic filter having a honeycomb structure 10 having a large number of cells which are extending in the longitudinal direction and which are alternatively plugged on an exhaust gas G inlet side end face 10a and an exhaust gas G outlet side end face 10b to form plugged portions. The depth of the inlet side plugged portions (filler 16) is formed deeper than that of the outlet side plugged portions (filler 16). Since the exhaust gas G tends to have a decreased turbulent flow and an increased laminar flow on the inlet side, a partial accumulation of Oil-Ash on portions near an outlet side end face can be inhibited.

7 Claims, 7 Drawing Sheets

CERAMIC FILTER

BACKGROUND

Field of the Invention

The present invention relates to a ceramic filter used for purifying exhaust gas from a diesel engine, such as a DPF (diesel engine particulate filter).

Since exhaust gas from a diesel engine contains various kinds of particulate matter, it is necessary to purify exhaust gas for removing particulate matter when exhaust gas is discharged in the air. Therefore, a ceramic filter such as a DPF is incorporated into an exhaust gas system of a diesel engine.

Figure 13:
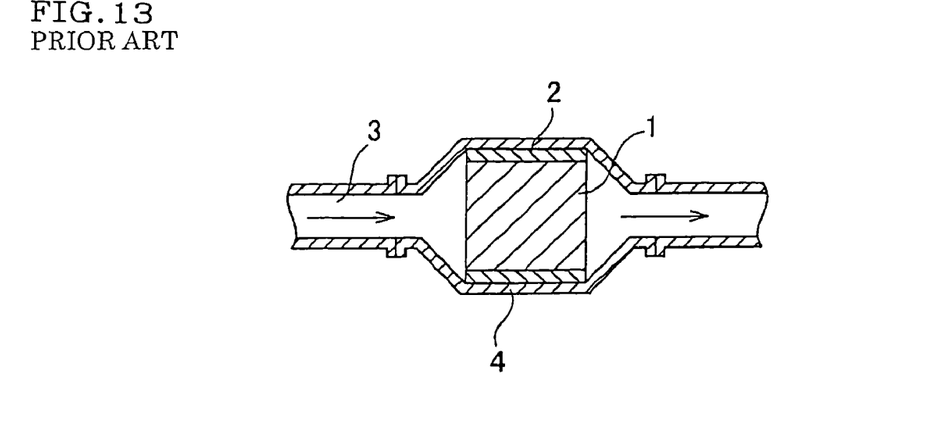
FIG. 13 is a sectional view showing an example where a ceramic filter is used.

FIG. 13 shows a state of incorporating a ceramic filter 1 into an exhaust gas system. A casing 4 is arranged in the middle of an exhaust pipe 3 of a diesel engine, and exhaust gas from the diesel engine is purified by disposing the ceramic filter 1 in the casing 4 via a heat insulator 2.

Figure 14:
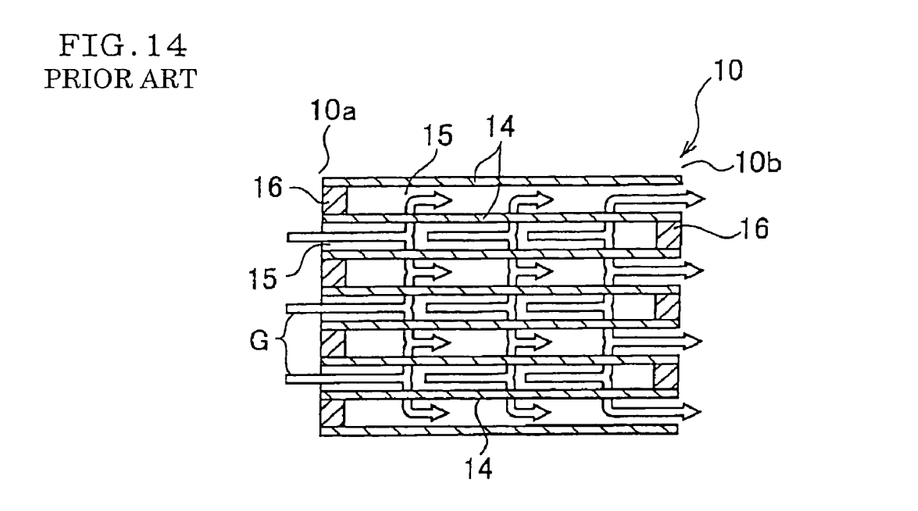
FIG. 14 is a sectional view showing an exhaust gas flow in a honeycomb structure.
Figure 15:
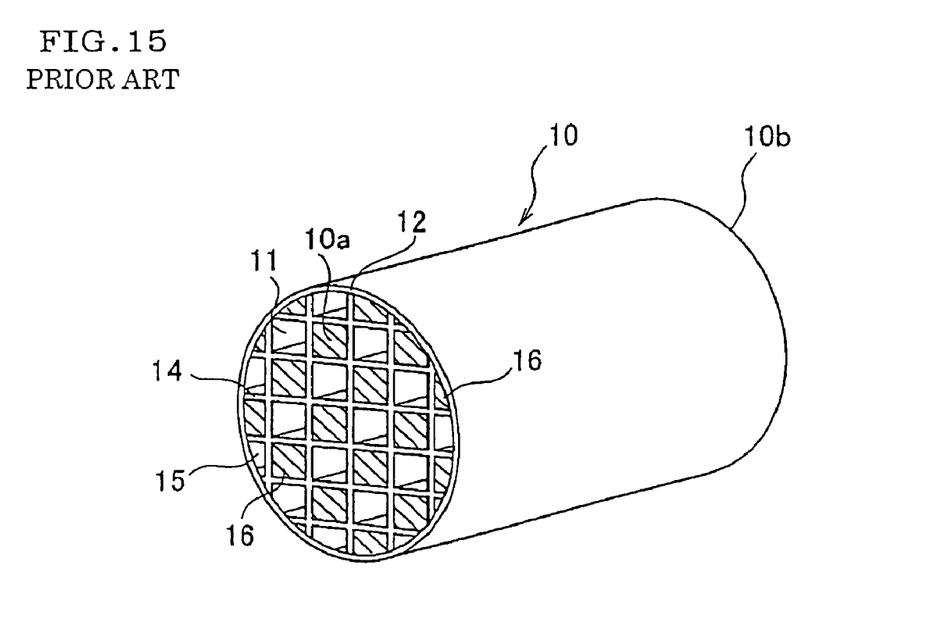
FIG. 15 is a perspective view of an example of a honeycomb structure.

FIGS. 14 and 15 show a honeycomb structure 10 used for a DPF as a ceramic filter 1. The honeycomb structure 10 comprises a porous ceramic such as silicon carbide and has a large number of cells 11 extending in the longitudinal direction. The outer peripheral surface is covered with a sealing material 12 of cement or the like. Each cell 11 has a through channel 15 in the longitudinal direction. The through channel 15 of each cell 11 is separated from a through channel 15 of an adjacent cell 11 by a cell wall 14.

The cell wall 14 separating the through channel 15 from one another functions as a filter. That is, in the honeycomb structure 10, cells 11 are alternately plugged by the filler 16 on the exhaust gas inlet side faces 10a, while the adjacent cells 11 are plugged by a filler 16 on the exhaust gas outlet side end faces 10b. By this structure, an exhaust gas G flowing into the cells 11 passes through the cell walls 14. When the gas passes through the cell walls 14, the exhaust gas G is filtrated, and particulate matter in the exhaust gas G is removed.

Figure 16:
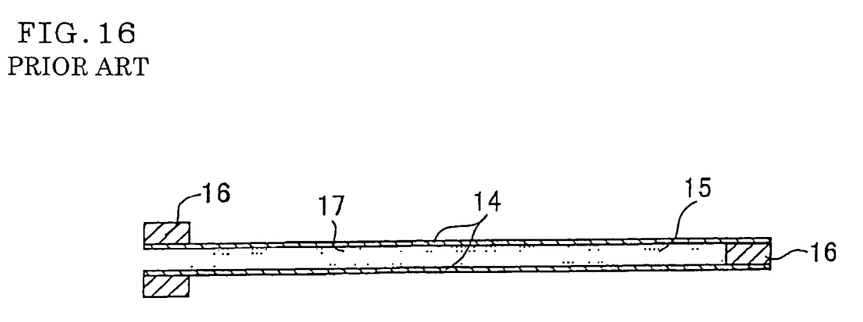
FIG. 16 is a sectional view showing the state of particulate accumulation in a honeycomb structure.

In such a honeycomb structure 10, particulate matter accumulates in the course of continuous use. FIG. 16 shows a state of the accumulation, where particulate matter 17 adheres to cell walls 14, and pressure loss of a filter is increased by the adhesion.

Examples of particulate matter from a diesel engine include soot and Oil-Ash, and each of them causes pressure loss such as a soot accumulation pressure loss and an Oil-Ash pressure loss.

The soot accumulation pressure loss is a factor affecting an engine output and mileage, and when a certain amount or more of soot accumulates, the soot is removed by combustion to regenerate the honeycomb structure known as a conventional method. It has already been known that the honeycomb structure can be recovered from pressure loss by the method (see Patent Document 1).

Oil-Ash is a mixture with exhaust gas caused by discharge of unburned component of lubricating oil or fuel. Unlike soot, Oil-Ash can not be removed by combustion. Therefore, the Oil-Ash pressure loss serves as a yardstick of durability of the honeycomb structure. That is, when the Oil-Ash pressure loss reaches a certain level or more, it is necessary to replace the honeycomb structure with a new one because it does not function as a filter any more.

Patent Document 1: JP-A-5-261300 (Page 2)

Figure 4:
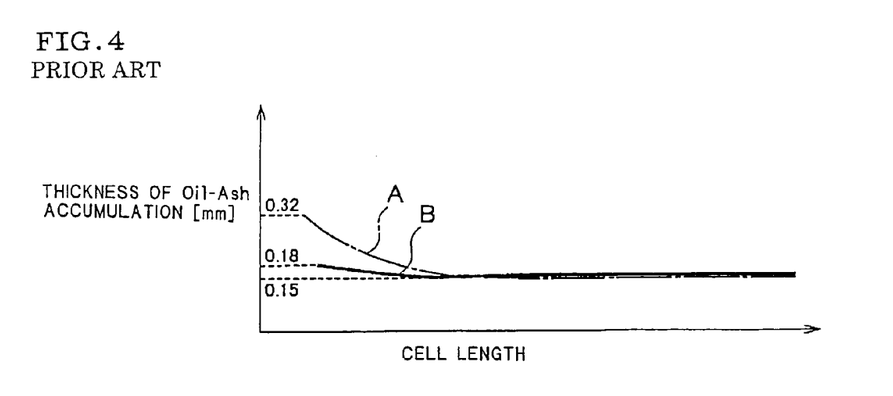
FIG. 4 is a characteristic view showing thickness of Oil-Ash accumulation with respect to cell length.

The Oil-Ash accumulates more in the vicinity of the exhaust gas inlet side end face 10a of the honeycomb structure 10 than in the other parts. Since a flow containing soot has a drift in the vicinity of the exhaust gas inlet side end face 10a, Oil-Ash is prone to accumulate there. The characteristic curve A in FIG. 4 shows thickness of an amount of Oil-Ash accumulation in a honeycomb structure which has conventionally been used. After about 100,000 km traveling (equivalence), the thickness in the vicinity of the exhaust gas inlet side end face is 0.32 mm, which is twice or more as thick as that of the exhaust gas outlet side end face.

Incidentally, in a conventional honeycomb structure 10, the depth of the filler 16 at plugged portions is almost the same both on the exhaust gas inlet side and the exhaust gas outlet side, and is formed, for example, to be 2.5 to 4.0 times as deep as a cell opening diameter (described below).

Figure 5:
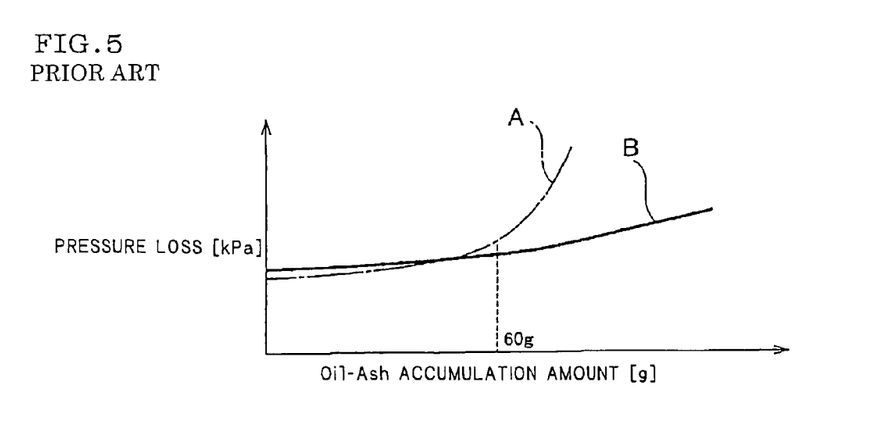
FIG. 5 is a characteristic view showing pressure loss with respect to Oil-Ash accumulation amount.

FIG. 5 shows a pressure loss with respect to an amount of Oil-Ash accumulation, where the characteristic curve A shows a pressure loss of a conventionally used honeycomb structure. A pressure loss sharply rises in the vicinity of Oil-Ash accumulation amount of 60 g. When a pressure loss rises in this way, the honeycomb structure has almost run down as described above. Therefore, it is necessary to change the honeycomb structure to a new honeycomb structure.

Thus, in a conventional honeycomb structure, since Oil-Ash is prone to accumulate, the accumulation amount easily reaches the limit amount. Thus, as a problem, a conventional honeycomb structure needs to be replaced with high frequency.

The present invention has been made in consideration of such a conventional problem and aims to provide a ceramic filter capable of improving durability of a honeycomb structure by being structured so that Oil-Ash should hardly accumulate on the honeycomb structure.

SUMMARY

In order to achieve the above object, there is provided a ceramic filter of the present invention having a monolithic honeycomb structure formed as a monolithic body having a large number of cells which are extending in the longitudinal direction and which are alternatively plugged on each of the exhaust gas inlet side and outlet side end faces to form plugged portions, characterized in that the depth of the inlet side plugged portions is formed deeper than that of the outlet side plugged portions.

Since the depth of the inlet side plugged portions is formed deeper than that of the outlet side plugged portions, exhaust gas tends to have a decreased turbulent flow and an increased laminar flow, and thereby a partial accumulation of Oil-Ash to portions near an inlet side end face of a monolithic honeycomb structure can be inhibited.

The ceramic filter discussed above may be characterized in that the depth of the inlet side plugged portions is formed to be 3.4 to 12.9 times as deep as a cell opening diameter on an average.

By thus controlling the depth of the inlet side plugged portions to be 3.4 to 12.9 times a diameter of cell opening, a laminar flow tendency of the inlet side exhaust gas can be increased more securely.

The ceramic filter discussed above may be characterized in that the depth of the inlet side plugged portions is formed so as to become deeper from a central portion toward an outer peripheral portion of the monolithic honeycomb structure.

Since an exhaust gas flow rate in the outer peripheral portion of a honeycomb structure is lower than that in the central portion of a honeycomb structure, Oil-Ash is prone to accumulate in the peripheral portion. Therefore, by forming the inlet side plugged portions in the peripheral portion of the honeycomb structure deeper than those in the central portion, distribution of Oil-Ash accumulation in a cross section perpendicular to a longitudinal direction of cells in the honeycomb structure can be made almost uniform.

The ceramic filter discussed above may be characterized in that the depth of the inlet side plugged portions at the outer peripheral portion is 1.05 to 10.0 times as deep as the inlet side plugged portions at the central portion on an average.

Thus, by forming the depth of the inlet side plugged portions in the outer peripheral portion to be 1.5 to 10.0 times as deep as the inlet side plugged portions in the central portion on an average, distribution of Oil-Ash accumulation in a cross section perpendicular to a longitudinal direction of cells in the honeycomb structure can be made uniform more securely.

The ceramic filter may have a joined type honeycomb structure formed by joining a plurality of segments having a large number of cells which are extending in the longitudinal direction and which are alternatively plugged on each of the exhaust gas inlet side end faces and exhaust gas outlet side end faces, characterized in that the depth of the inlet side plugged portions is formed deeper than that of the outlet side plugged portions.

Since the depth of the inlet side plugged portions is thus formed deeper than that of the outlet side plugged portions, the exhaust gas tends to have a decreased turbulent flow and an increased laminar flow on the inlet side, and thereby a partial accumulation of Oil-Ash on portions near the inlet side end face of a joined type honeycomb structure can be inhibited.

The ceramic filter discussed above may be characterized in that the depth of the inlet side plugged portions of the segments is formed so as to become deeper from a central portion toward an outer peripheral portion of the joined type honeycomb structure.

Since the depth of the inlet side plugged portions is thus formed so as to become deeper from a central portion toward an outer peripheral portion of the joined type honeycomb structure, distribution of Oil-Ash accumulation in a cross section perpendicular to a longitudinal direction of cells in the honeycomb structure can be made almost uniform in each segment.

The ceramic filter discussed above may be characterized in that the depth of the inlet side plugged portions of the segment constituting the outermost peripheral portion of the joined type honeycomb structure is 1.05 to 5.0 times as deep as the inlet side plugged portions of the segment constituting the central portion of the joined type honeycomb structure on an average.

By forming the depth of the inlet side plugged portions of the segment constituting the outermost peripheral portion of the joined type honeycomb structure to be 1.05 to 5.0 times as deep as the inlet side plugged portions of the segment constituting the central portion of the joined type honeycomb structure on an average, distribution of Oil-Ash accumulation in a cross section perpendicular to a longitudinal direction of cells in the honeycomb structure can be made uniform more securely in each segment.

The ceramic filter discussed above may be characterized in that the depth of the inlet side plugged portions of each segment is formed so as to become deeper from a central portion toward an outer peripheral portion of the segment.

By forming the depth of the inlet side plugged portions of each segment so as to become deeper from a central portion toward an outer peripheral portion of the segment, distribution of Oil-Ash accumulation in a cross section perpendicular to a longitudinal direction of cells in the honeycomb structure can be made almost uniform in each segment. In general, distribution of Oil-Ash accumulation in a cross section perpendicular to a longitudinal direction of cells in the honeycomb structure can be made uniform more securely in each segment.

The ceramic filter discussed above may be characterized in that the depth of the inlet side plugged portions of the outer peripheral portion of each segment is 1.05 to 3.0 times as deep as the inlet side plugged portions of the central portion of the segment on an average.

By forming the depth of the inlet side plugged portions of the outer peripheral portion of each segment to be 1.05 to 3.0 times as deep as the inlet side plugged portions of the central portion of the segment on an average, distribution of Oil-Ash accumulation in a cross section perpendicular to a longitudinal direction of cells in segment can be made uniform more securely.

According to the invention, since the exhaust gas tends to have a decreased turbulent flow and an increased laminar flow on the inlet side of a monolithic honeycomb structure, a partial accumulation of Oil-Ash on portions near the inlet side end face can be inhibited. By this, an accumulation amount of Oil-Ash does not reach the limit amount at an early stage, and, as a result, durability of the ceramic filter can be improved.

According to the invention, by controlling the depth of the inlet side plugged portion to be 3.4 to 12.9 times a diameter of cell opening, a laminar flow tendency on the exhaust gas inlet side can be increased more securely. This further improves durability of a ceramic filter in addition to the effect of the invention.

According to the invention, by forming the depth of the inlet side plugged portions in the peripheral portion of the honeycomb structure deeper than that in the central portion, distribution of Oil-Ash accumulation in a cross section perpendicular to a longitudinal direction of cells in the honeycomb structure can be made almost uniform. This further improves durability of a ceramic filter in addition to the effect of the invention.

According to the invention, by forming the depth of the inlet side plugged portions in the outer peripheral portion to be 1.05 to 10.0 times as deep as the inlet side plugged portions in the central portion on an average, distribution of Oil-Ash accumulation in a cross section perpendicular to a longitudinal direction of cells in the honeycomb structure can be made uniform more securely. This further improves durability of a ceramic filter in addition to the effect of the invention.

According to the invention, since the depth of the inlet side plugged portions on a joined type honeycomb structure is thus formed deeper than the outlet side plugged portions, the exhaust gas tends to have a decreased turbulent flow and an increased laminar flow on the inlet side, and thereby partial accumulation of Oil-Ash on portions near the inlet side end face of a joined type honeycomb structure can be inhibited. Therefore, an accumulation amount of Oil-Ash does not reach the limit amount at an early stage, and, as a result, durability of the ceramic filter can be improved.

According to the invention, since the depth of the inlet side plugged portions are formed so as to become deeper from a central portion toward an outer peripheral portion of the joined type honeycomb structure, distribution of Oil-Ash accumulation in a cross section perpendicular to a longitudinal direction of cells in the honeycomb structure can be made almost uniform in each segment. This further improves durability of a ceramic filter in addition to the effect of the invention.

According to the invention, by forming the depth of the inlet side plugged portions of the segment constituting the outermost peripheral portion of the joined type honeycomb structure to be 1.05 to 5.0 times as deep as the inlet side plugged portions of the segment constituting the central portion of the joined type honeycomb structure on an average, distribution of Oil-Ash accumulation in a cross section perpendicular to a longitudinal direction of cells in the honeycomb structure can be made uniform more securely in each segment. This further improves durability of a ceramic filter in addition to the effect of the invention.

According to the invention, by forming the depth of the inlet side plugged portions of each segment so as to become deeper from a central portion toward an outer peripheral portion of the segment, distribution of Oil-Ash accumulation in a cross section perpendicular to a longitudinal direction of cells in the honeycomb structure can be made almost uniform in each segment. In general, distribution of Oil-Ash accumulation in a cross section perpendicular to a longitudinal direction of cells in the honeycomb structure can be made uniform more securely in each segment. This further improves durability of a ceramic filter in addition to the effect of the invention.

According to the invention, by forming the depth of the inlet side plugged portions of the outer peripheral portion of each segment to be 1.05 to 3.0 times as deep as that of the inlet side plugged portions of the central portion of the segment on an average, distribution of Oil-Ash accumulation in a cross section perpendicular to a longitudinal direction of cells in segment can be made uniform more securely. This further improves durability of a ceramic filter in addition to the effect of the invention.

| Description Of Reference Numerals | |
|---|---|
| 10: | honeycomb structure |
| 10a: | inlet side end face |
| 10b: | outlet side end face |
| 11: | cell |
| 13: | segment |
| 14: | cell wall |
| 15: | through channel |
| 16: | filler |
| A: | inlet side plugged portion |
| B: | outlet side plugged portion |

DETAILED DESCRIPTION OF THE EMBODIMENTS

The present invention will hereinbelow be described in more detail on the basis of an illustrated embodiment. In this embodiment, the same reference numerals are used in parts common to prior art.

A ceramic filter 1 (see FIG. 13) used in this embodiment is constituted by a honeycomb structure 10 of porous ceramic such as silicon carbide as shown in FIG. 15.

Figure 17:
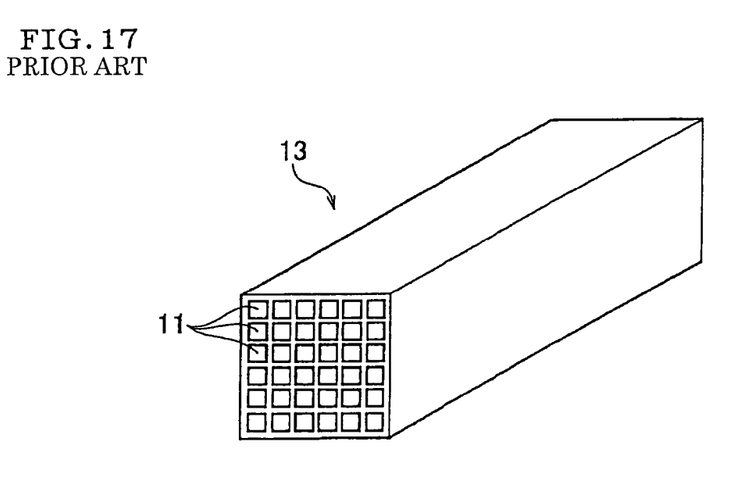
FIG. 17 is a perspective view of an example of a segment.

Such a honeycomb structure 10 may be a monolithic honeycomb structure formed as a monolithic body having a plurality of cells 11 extending in a longitudinal direction or a joined type honeycomb structure formed by joining a plurality of segment 13 (FIG. 17) having a plurality of cells 11 extending in a longitudinal direction.

Each cell 11 has a through channel 15 in the longitudinal direction. The through channel 15 in each cell 11 is separated from the through channel 15 of the adjacent cell 11 by cell walls 14.

In a ceramic filter 1 having this honeycomb structure 10, an exhaust gas inlet side end face 10a of the cell 11 is alternately plugged with a filler 16, while in an exhaust gas outlet side end face 10b the adjacent cell is plugged with a filler 16. By this structure, the exhaust gas G flowing into the cell 11 passes through the cell wall 14, and the exhaust gas G is filtrated when the gas passes through the cell wall 14. Thus, particulate such as Oil-Ash and soot can be removed.

In this ceramic filter 1, regardless of a monolithic honeycomb structure or a joined type honeycomb structure, the depth of the inlet side plugged portions is formed deeper than that of the outlet side plugged portions.

Figure 1:
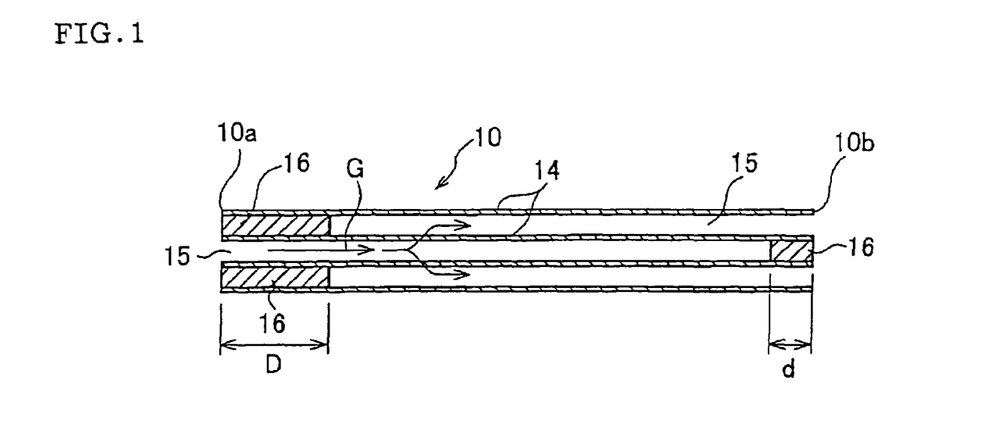
FIG. 1 is a sectional view of the main part in an embodiment of the present invention.

That is, as shown in FIG. 1, the depth D (length of filler 16) of the inlet side plugged portions on the exhaust gas G inlet side end face 10a of the honeycomb structure 10 is formed to be deeper than the depth d (length of filler 16) of the outlet side plugged portions.

In this structure, since flow of the exhaust gas G tends to have a decreased turbulent flow and an increased laminar flow on the inlet side, a partial accumulation of Oil-Ash on portions near an inlet side end face 10a (particularly near the inner tip of the filler 16) of the honeycomb structure 10 can be inhibited.

To be specific, when the honeycomb structure 10 is unitarily formed, the average the depth D of the inlet side plugged portions can be made 3.4 to 12.9 times the cell opening diameter.

According to this structure, increase in a laminar flow tendency of the exhaust gas G at the inlet side 10a can be secured more firmly, and a partial accumulation of Oil-Ash on portions near the inlet side end face of the monolithic honeycomb structure can be inhibited.

Preferably, the inlet side plugged portions are formed so as to have the average the depth D of 3.4 to 8.5 times a cell opening diameter.

Figure 2:
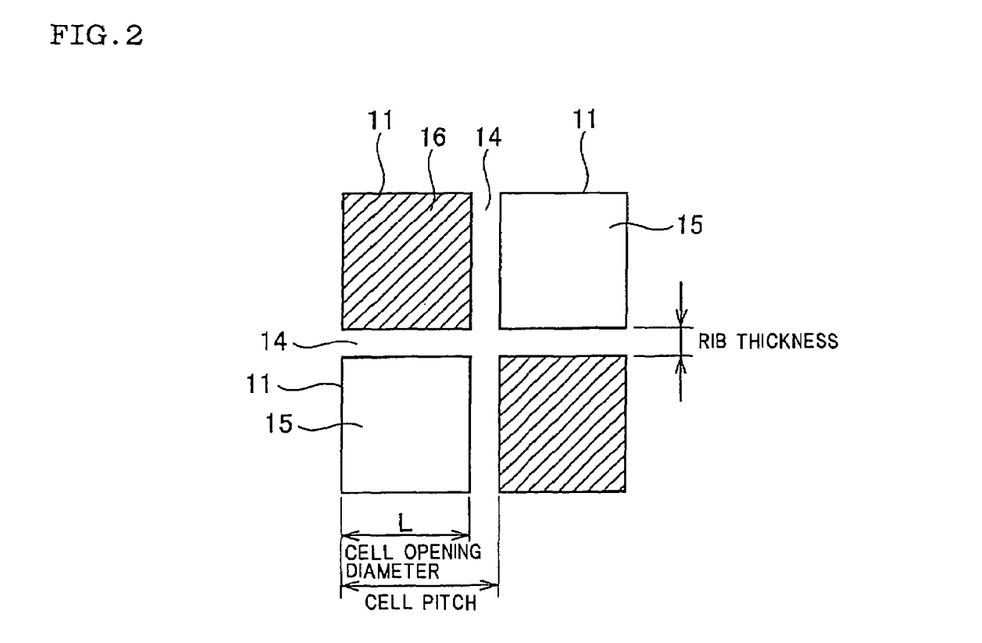
FIG. 2 is a front view of the main part of a honeycomb structure, showing a cell opening diameter.

As shown in FIG. 2, the cell opening diameter L at this time can be obtained by deducting a rib thickness (thickness of a cell wall 14) from a cell pitch, which shows a length of a side of the cells 11 partitioned by the cell wall 14.

FIG. 1 partially shows the honeycomb structure 10 having such a structure, where the filler 16 is longer on the exhaust gas inlet side end face 10a, and the depth D of the plugged portions formed with the filler 16 is 3.4 to 8.5 times the cell opening diameter L. Incidentally, on the exhaust gas G outlet side end face 10b, the depth d of the plugged portions is similar to that of the conventional structure.

As the depth D of the plugged portion on an inlet side end face 10a becomes deeper, a hollow portion (filtration portion) of the cell wall 14 becomes shorter, and area where Oil-Ash accumulates (area where exhaust gas passes) decreases, which raise pressure loss even when soot does not accumulate.

Figure 3:
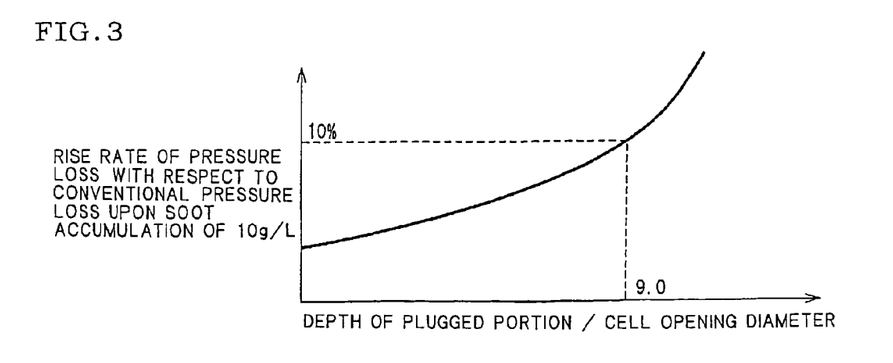
FIG. 3 is a characteristic view showing a ratio of the depth of plugged portions to a cell opening diameter and a rise rate of pressure loss.

FIG. 3 shows a ratio of pressure loss in the case that a proportion of the depth of a plugged portion to a cell opening diameter was changed. The vertical axis shows a percentage of rise in pressure loss measured when at 10 g/L of soot is accumulated compared with pressure loss of a conventional structure. The horizontal axis shows a ratio of the depth of a plugged portion to a cell opening diameter. When the depth of a plugged portion/cell opening diameter was 9.0, pressure loss rises by 10% in comparison with the conventional structure. Such rise in pressure loss deteriorates efficiency of trapping particulates in the exhaust gas G. Therefore, in this embodiment, the upper limit of the depth D of the plugged portion is made to be 8.5 times a cell opening diameter L.

When the depth of the plugged portion does not reach 3.4 times a cell opening diameter L, effect in inhibiting a turbulent flow of exhaust gas on the inlet side end face 10a becomes small. Therefore, in this embodiment, the lower limit of the depth D of the plugged portion is made to be 3.4 times a cell opening diameter L.

The characteristic curve B shown in FIG. 4 shows the result of Oil-Ash accumulation thickness measured by the embodiment set as described above. After about 100,000 km traveling (equivalence), Oil-Ash accumulation thickness in the vicinity of the inlet side end face 10a was 0.18 mm (thickness), which is about 1.2 times the accumulation amount (0.15 mm (thickness)) of the outlet side end face 10b. Thus, in the through channel 15 Oil-Ash accumulated almost uniformly on the cell wall 14. Therefore, exhaust gas can flow smoothly without staying in the through channel 15, which enables to inhibit deterioration in pressure loss.

In addition, as shown by the characteristic curve B in FIG. 5, in this embodiment pressure loss with relation to an amount of Oil-Ash accumulation rises gently even when an amount of Oil-Ash accumulation increases. This can extend life span of a honeycomb structure 10.

More preferably, the depth of the inlet side plugged portions is formed so as to become deeper from the central portion toward the outer peripheral portion of a monolithic honeycomb structure 10. In the case of a joined type honeycomb structure 10, the depth of the inlet side plugged portions of each of a plurality of segments 13 is formed so as to become deeper from the central portion toward the outer peripheral portion of a joined type honeycomb structure 10.

Since in an outer peripheral portion of a honeycomb structure 10, an exhaust gas flow rate is lower than that in a central portion, Oil-Ash is prone to accumulate in the peripheral portion.

This structure is made to take measures against the fact that an exhaust gas flow rate in an outer peripheral portion is lower than that in a central portion of a unitary (or joined) type honeycomb structure 10. Since, by forming the depth D of the inlet side plugged portions of the outer peripheral portion of a honeycomb structure 10 larger than that in the central portion, distribution of Oil-Ash accumulation in a cross section perpendicular to a longitudinal direction of cells in the honeycomb structure 10 can be made almost uniform. Therefore, it can inhibit an amount of Oil-Ash accumulation on the outer peripheral portions reaching the limit amount at an early stage.

More preferably, in a monolithic honeycomb structure 10, the depth of the inlet side plugged portions of the outer peripheral portions is 1.05 to 10.0 times as deep as the inlet side plugged portions of the central portion on an average. In a joined type honeycomb structure 10, the depth of the inlet side plugged portions of the segment constituting the outermost peripheral portion of the joined type honeycomb structure 10 are preferably 1.05 to 5.0 times, more preferably 1.05 to 3.0 times, as deep as that of the inlet side plugged portions of the segment constituting the central portion of the joined type honeycomb structure on an average.

When the depth of the plugged portions in the outermost peripheral portion is 1.5 or less times that in the central portion, Oil-Ash accumulates more on the outer peripheral side, and soot accumulates more in the central portion. Therefore, heat generation by soot combustion becomes larger on the central side than on the outer peripheral side upon regeneration, and a temperature difference between the central side and the outer peripheral side becomes large. When the temperature difference becomes very large, cracks may occur by a thermal shock due to the temperature difference.

On the other hand, when the depth of the plugged portions in the outer peripheral portion is 3.0 or more, further 5.0 or more times that in the central portion, a cell area where gas passes through becomes smaller by making the depth of the plugged portions on the outer peripheral portion larger, which increases pressure loss.

More preferably in a monolithic honeycomb structure 10, the depth of inlet side plugged portions of each segment is formed so as to become deeper from a central portion toward an outer peripheral portion of the segment.

According to this structure, distribution of Oil-Ash accumulation in a cross section perpendicular to a longitudinal direction of cells can be made almost uniform in each segment. In general, distribution of Oil-Ash accumulation in a cross section perpendicular to a longitudinal direction of cells in the honeycomb structure 10 can be made uniform more securely.

More preferably, in a joined type honeycomb structure 10, the depth of the inlet side plugged portions of the outer peripheral portion of each segment is 1.05 to 3.0 times, more preferably 1.05 to 2.0 times, as deep as the depth of the inlet side plugged portions of the central portion of the segment on an average.

In the case of a joined type honeycomb structure, gas inflow velocity becomes slower in cells adjacent to the joint portions of each segment than in the central portion of each segment because gas does not pass through the joint portion. That is, in each segment, distribution of gas inflow velocity is formed similarly to that of a monolithic honeycomb structure.

Therefore, when the depth of the plugged portions in the outer peripheral portion is 1.05 or less times that in the central portion of each segment, Ash is prone to accumulate in the outer peripheral portion of each segment, and cracks may be caused due to the large temperature difference between the outer peripheral portion and the central portion.

On the other hand, when the depth of the plugged portions in the outer peripheral portion is 2.0 or more, further 3.0 or more, times that in the central portion of each segment, a cell area where gas passes through becomes smaller by making the depth of the plugged portions on the outer peripheral portion deeper similarly to a monolithic honeycomb structure, which increases pressure loss.

According to this structure, distribution of Oil-Ash accumulation in a cross section perpendicular to a longitudinal direction of cells in segment can be made uniform more securely.

Next, Examples of the present invention will be described. However, the present invention is not limited to the following Examples, and various modifications can be made within the range of the gist of the present invention. For example, cells may have a different section such as a circle.

EXAMPLES

Examples 1 to 4, Comparative Example 1

There were laminated 16 segments having a cell density of 46.5 cell/cm$^2$, a cell wall thickness (rib thickness) of 0.3 mm, and a square having a side length of 35.4 mm to manufacture a cylindrical joined type honeycomb structure having a length of 152.4 mm in an axial direction and a volume of 2.5 liter.

This joined type honeycomb structure was subjected to plugging as follows to manufacture Comparative Example 1 and Examples 1 to 3 each as a test ceramic filter. At this time, the depth of the outlet side plugged portions was formed to have the same the depth for all the test ceramic filters.

Comparative Example 1

The inlet side plugged portions were formed to have the depth D of three times a cell opening diameter (D=3 L).

Example 1

The inlet side plugged portions were formed to have the depth D of six times a cell opening diameter (D=6 L).

Example 2

The inlet side plugged portions were formed to have the depth D of eight times a cell opening diameter (D=8 L).

Example 3

The inlet side plugged portions were formed to have the depth D of ten times a cell opening diameter (D=10 L).

Example 4

Figure 7:
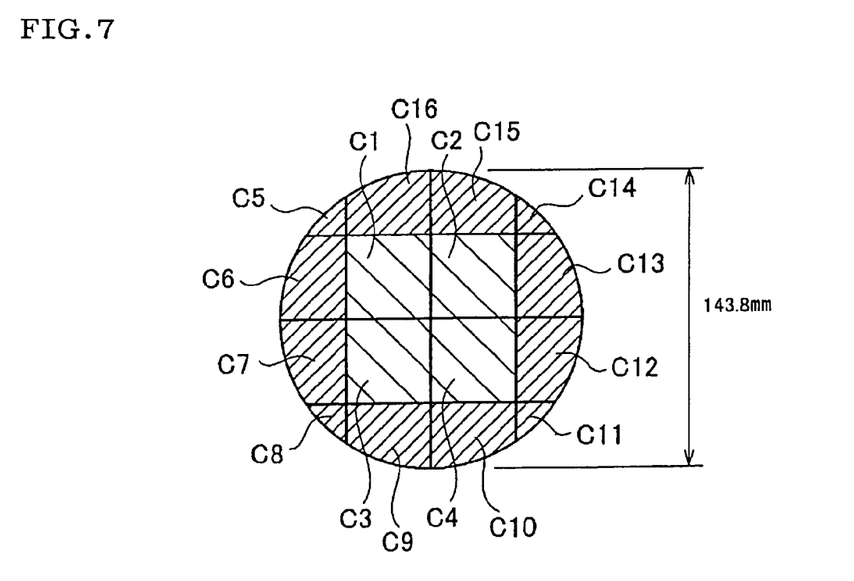
FIG. 7 is a front view of a joined type honeycomb structure of Example 4.

As shown in FIG. 7, the depth D of the inlet side plugged portion of four segments C1 to C4 in the central portions was made to be five times the cell opening diameter L (D=5 L), and the depth D of the inlet side plugged portions of 12 segments C5 to C16 in the outer peripheral portions was made to be seven times the cell opening diameter L (D=7 L).

Each of the test ceramic filter in Comparative Example 1 and Examples 1 to 4 was disposed in an exhaust gas system of a diesel engine having an engine displacement of 2.0 liters. Temperature of exhaust gas was kept to be 300° C. The state of 600° C. of exhaust gas temperature was maintained for 15 minutes for every five hours to regenerate the test ceramic filters. By the regeneration, soot completely disappeared, and only Oil-Ash accumulated. The test ceramic filters were weighed to measure the amount of Oil-Ash accumulation. The test was conducted until the weight of the Oil-Ash accumulation reached 150 g.

Figure 6:
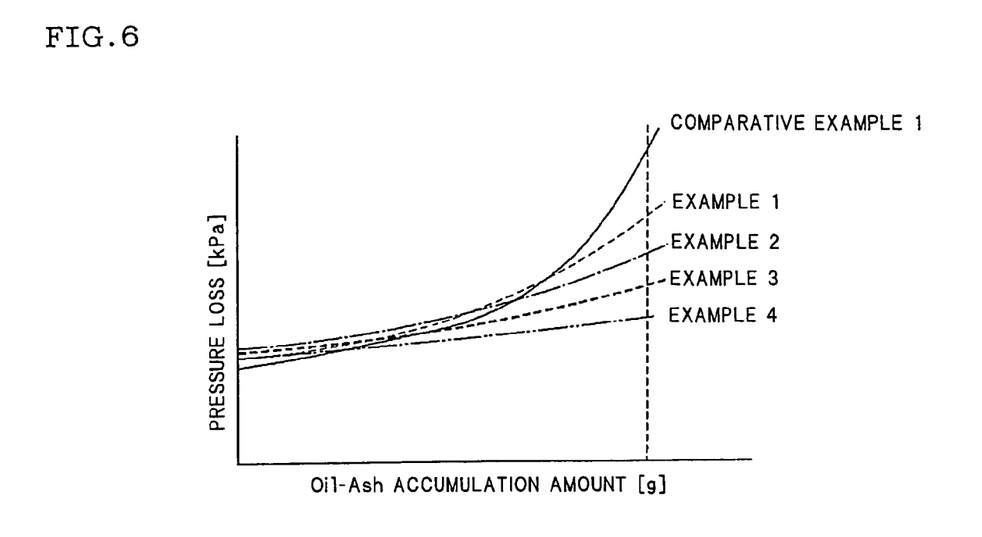
FIG. 6 is a characteristic view showing pressure loss with respect to Oil-Ash accumulation amount in Examples 1 to 4 and Comparative Example 2.

FIG. 6 shows a change in pressure loss till Oil-Ash accumulation reached 150 g. Table 1 is a comparison of the pressure loss of each of Examples 1 to 4 when Oil-Ash accumulation reached 150 g. The values are given by comparing the pressure losses with defining the pressure loss of Comparative Example 1 as 1.

TABLE 1

| | |
|---|---|
| Comparative Example 1 | 1.0 |
| Example 1 | 0.8 |
| Example 2 | 0.65 |
| Example 3 | 0.6 |
| Example 4 | 0.5 |

As obvious from FIG. 6, the pressure losses gently rose in Examples 1 to 4, while the pressure loss steeply rose in Comparative Example 1.

In addition, as obvious from Table 1, Examples 1 to 4 showed values of less than 1, and the suppressing effect of increasing pressure loss was confirmed.

Further, Example 4 took measures against the fact that an exhaust gas flow rate in an outer peripheral portion is lower than that in a central portion of a honeycomb structure, and the depth of the plugged portions of the honeycomb structure on the outer peripheral side was made larger than that on the central side. As obvious from FIG. 6 and Table 1, the distribution of Oil-Ash was made uniform and an accumulation amount of Oil-Ash in the outer peripheral side was inhibited from reaching the critical amount at an early stage.

Example 5 to 11, Comparative Example 2 to 3

Test ceramic filter: diameter of 143.8 mm, length of 152.4 mm, 12 mil/300 cpsi

Data of plugging for each sample are shown in Table 2, and the schematic views are shown in FIGS. 8 to 11. The reference numerals A and B in the figures show the inlet side and outlet side plugged portions respectively. The depth of outlet side plugged portions of each sample has a constant the depth of 5 mm.

TABLE 2

| Test ceramic filter | Type of honeycomb structure | The depth of plugged portion on inlet side | | Ratio to cell opening diameter Central portion | The depth ratio of plugged portion outer peripheral portion/central portion | The depth of outlet side plugged portion (mm) |
| --- | --- | --- | --- | --- | --- | --- |
| | | Central portion (mm) | Outer peripheral portion (mm) | | | |
| Comp. Ex. 2 | Monolithic | 5 | — | 4.3 | — | 5 |
| Example 5 | Monolithic | 7 | — | 6.0 | — | 5 |
| Example 6 | Monolithic | 9 | — | 7.7 | — | 5 |
| Comp. Ex. 3 | Monolithic | 18 | — | 15.5 | — | 5 |
| Example 7 | Monolithic | 5 to 9 | — | 4.3 to 7.7 | — | 5 |
| Example 8 | Joined Type | 9 | 10 | 7.7 | 1.1 | 5 |
| Example 9 | Joined Type | 9 | 15 | 7.7 | 1.7 | 5 |
| Example 10 | Joined Type | 5 to 7 | 5 to 7 | 4.3 to 6.0 | 1.0 | 5 |
| Example 11 | Joined Type | 5 to 7 | 8 to 10 | 4.3 to 6.0 | 1.6 to 20 | 5 |

Figure 8:
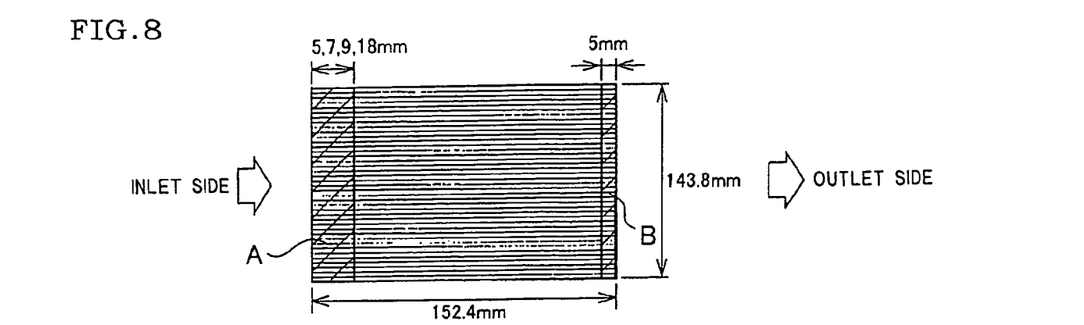
FIG. 8 is a schematic view showing the state of forming plugged portions of a monolithic honeycomb structure constituting Examples 5 and 6 and Comparative Examples 2 and 3.

Comparative Example 2 has a monolithic honeycomb structure, and the depth of the inlet side and outlet side plugging portions is 5 mm, which is shown in FIG. 8.

Example 5 has a monolithic honeycomb structure, and the depth of the inlet side plugged portions is 7 mm, which is shown in FIG. 8.

Example 6 has a monolithic honeycomb structure, and the depth of the inlet side plugged portions is 9 mm, which is shown in FIG. 8.

Comparative Example 3 has a monolithic honeycomb structure, and the depth of the inlet side plugged portions is 15.5 times as large as the cell opening diameter, which is shown in FIG. 8.

Figure 9:
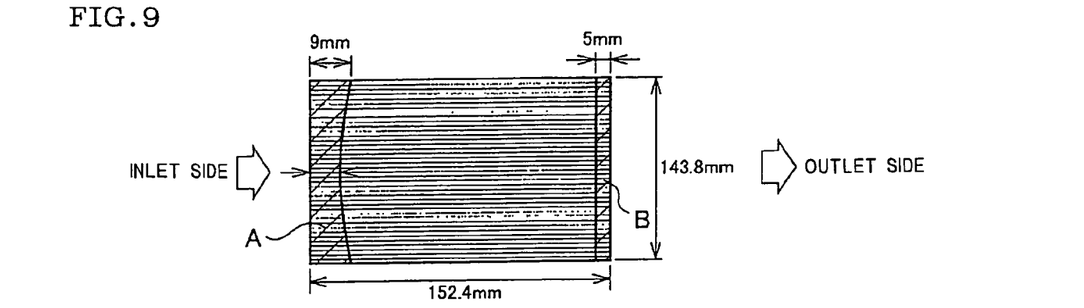
FIG. 9 is a schematic view showing the state of forming plugged portions of a monolithic honeycomb structure constituting Example 7.

Example 7 has a monolithic honeycomb structure, and the depth of the inlet side plugged portions is 5 mm in the central portion and 9 mm in the outer peripheral portion, which is shown in FIG. 9.

Figure 10:
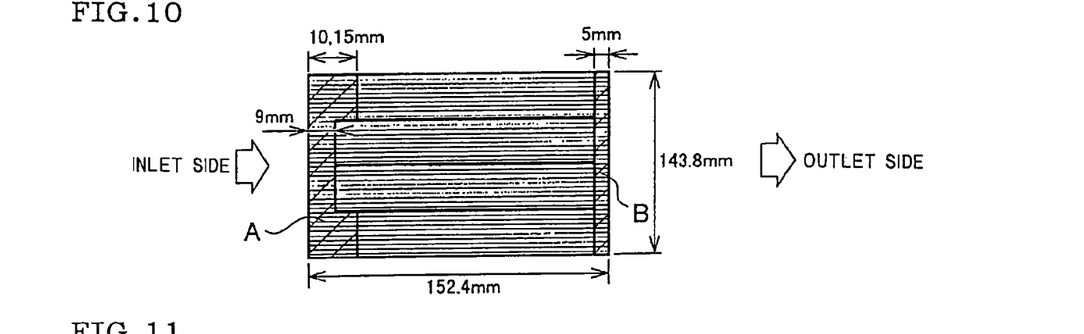
FIG. 10 is a schematic view showing the state of forming plugged portions of a joined type honeycomb structure constituting Examples 8 and 9.

Example 8 has a joined type honeycomb structure comprising a plurality of segments each has a square section having a side length of 35 mm, which is shown in FIG. 10.

Example 9 has a joined type honeycomb structure comprising a plurality of segments each has a square section having a side length of 35 mm, which is shown in FIG. 10.

Figure 11:
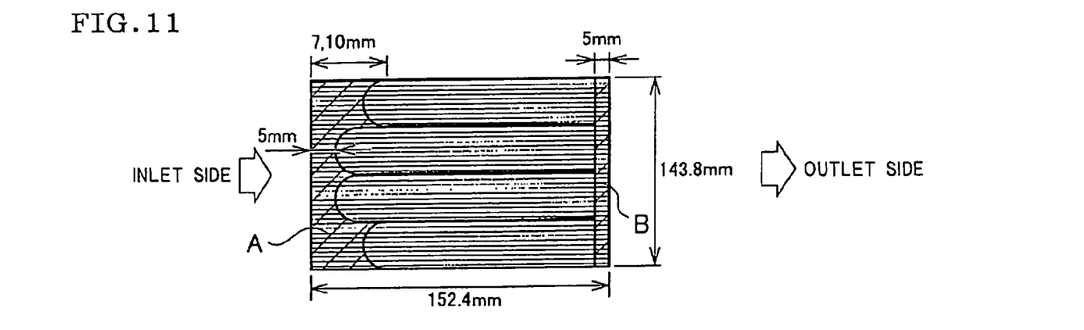
FIG. 11 is a schematic view showing the state of forming plugged portions of a joined type honeycomb structure constituting Examples 10 and 11.

Example 10 has a joined type honeycomb structure comprising a plurality of segments each has a square section having a side length of 35 mm, where the depth of the inlet side plugged portions is distributed in each segment, which is shown in FIG. 11.

Example 11 has a joined type honeycomb structure comprising a plurality of segments each has a square section having a side length of 35 mm, where the depth of the inlet side plugged portions is distributed in each segment, which is shown in FIG. 11.

Test conditions: Each of the test ceramic filter of Comparative Examples 2 and 3 and Examples 5 to 11 is disposed in an exhaust gas system of a diesel engine having an engine displacement of 2.0 liters. Temperature of exhaust gas was kept to be 250° C. The state of exhaust gas temperature of 600° C. was maintained for 10 minutes for every five hours to regenerate the test ceramic filters. This was repeated until the weight of the Oil-Ash accumulation reached 200 g. Then, the test ceramic filters were heated for three hours at 600° C. in an electric furnace to completely eliminate soot. The ceramic filters were subjected to a pressure loss measurement.

The pressure loss measurement was conducted under the conditions of 25° C. and wind velocity of 1 to 9 $Nm^3$/min. in a wind tunnel. The obtained pressure loss values at wind velocity of 9 $Nm^3$/min. were used as data for comparison.

Figure 12:
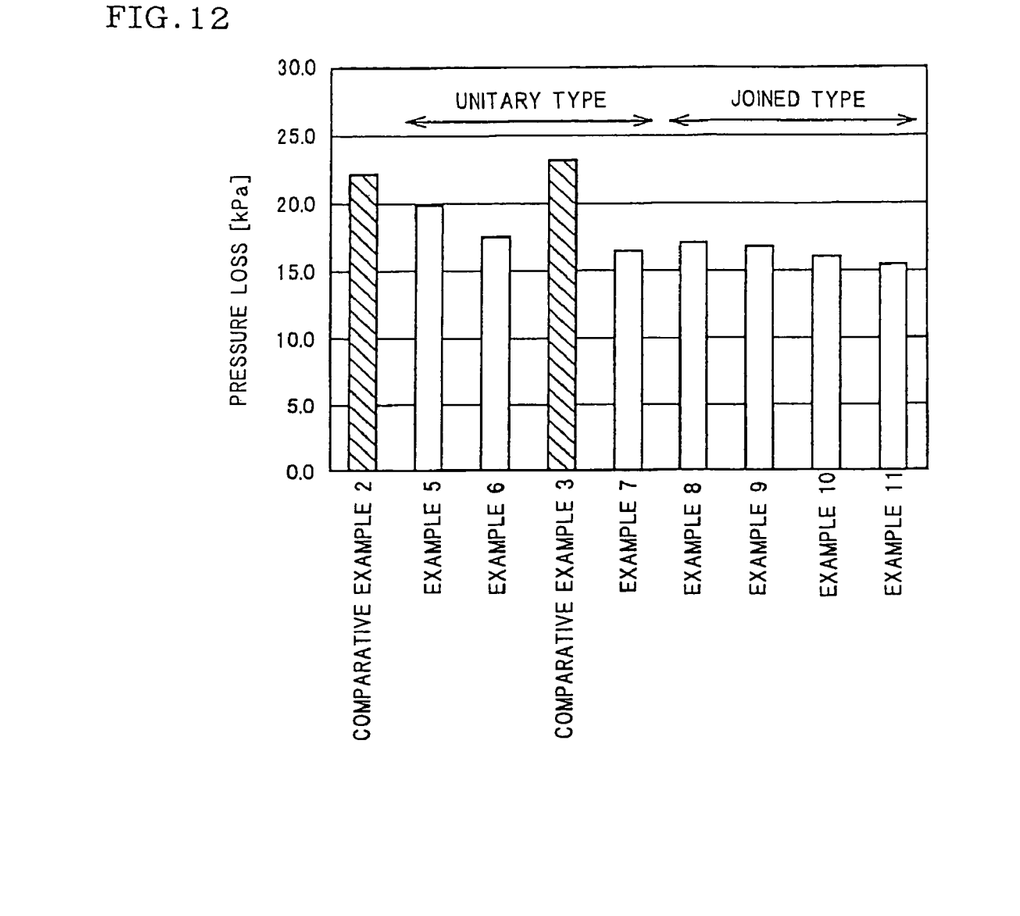
FIG. 12 is a bar chart showing pressure losses of Examples 5 to 11 and Comparative Examples 2 and 3.

Results: Table 3 shows pressure loss values at wind velocity of 9 $Nm^3$/min. and pressure loss ratios with defining the pressure loss of Comparative Example 2 as 1. FIG. 12 shows pressure loss values at wind velocity of 9 $Nm^3$/min. by a bar chart.

TABLE 3

| Test ceramic filter | Pressure loss value 9 $Nm^3$/min (kPa) | Pressure loss ratio with a criterion of Comparative Example 2 |
| --- | --- | --- |
| Comparative Example 2 | 22.0 | 1.00 |
| Example 5 | 19.8 | 0.90 |
| Example 6 | 17.6 | 0.80 |
| Comparative Example 3 | 23.1 | 1.05 |
| Example 7 | 16.5 | 0.75 |
| Example 8 | 17.2 | 0.78 |
| Example 9 | 16.9 | 0.77 |
| Example 10 | 16.1 | 0.73 |
| Example 11 | 15.6 | 0.71 |

As obvious from Table 3 and FIG. 12, Comparative Examples 2 and 3 each shows a pressure loss value of 22.0 or more, while Examples 5 to 11 each shows a pressure loss value of 20 or less and a pressure loss ratio of less than 1. Thus, a suppressing effect of increasing pressure loss can be confirmed.

INDUSTRIAL APPLICABILITY

A ceramic filter of the present invention can preferably be used as a DPF for purifying exhaust gas from a diesel engine.

The invention claimed is:

1. A ceramic filter comprising:
   a monolithic honeycomb structure formed as a monolithic body having a large number of cells which are extending in a longitudinal direction and which are alternatively plugged on each of an exhaust gas inlet side and an exhaust gas outlet side end faces to form plugged portions,
   wherein a length of the plugging portions at the inlet side is longer than that at the outlet side, and the plugging portions have a uniform cross-section area, and
   wherein the length of the inlet side plugged portions is formed so as to become longer from a central portion toward an outer peripheral portion of the monolithic honeycomb structure.

2. The ceramic filter according to claim 1, wherein the length of the inlet side plugged portions is formed so as to be 3.4 to 12.9 times as a cell opening diameter on an average.

3. The ceramic filter according to claim 1 wherein the length of the inlet side plugged portions at the outer peripheral portion is 1.05 to 10.0 times as that of the inlet side plugged portions of the central portion on an average.

4. A ceramic filter comprising:
a joined type honeycomb structure formed by joining a plurality of segments having a large number of cells which are extending in the longitudinal direction and which are alternatively plugged on each of the exhaust gas inlet side and exhaust gas outlet side end faces to form plugged portions,
wherein a length of the plugging portions at the inlet side is longer than that at the outlet side and the plugging portions have a uniform cross-section area, and
wherein the length of the inlet side plugged portions of the segments is formed so as to become longer from a central portion toward an outer peripheral portion of the joined type honeycomb structure.

5. The ceramic filter according to claim 4, wherein the length of the inlet side plugged portions of the segment constituting the outermost peripheral portion of the joined type honeycomb structure is 1.05 to 5.0 times as that of the inlet side plugged portions of the segment constituting the central portion of the joined type honeycomb structure on an average.

6. A ceramic filter comprising:
a joined type honeycomb structure formed by joining a plurality of segments having a large number of cells which are extending in the longitudinal direction and which are alternatively plugged on each of the exhaust gas inlet side and exhaust gas outlet side end faces to form plugged portions,
wherein a length of the plugging portions at the inlet side is longer than that at the outlet side, and the plugging portions have a uniform cross-section area, and
wherein the length of the inlet side plugged portions of each of the segments is formed so as to become longer from a central portion toward an outer peripheral portion of the segment.

7. The ceramic filter according to claim 6, wherein the length of the inlet side plugged portions at the outer peripheral portion of each segment is 1.05 to 3.0 times as that of the inlet side plugged portions at the central portion of the segment on an average.

* * * * *